Patented Jan. 1, 1935

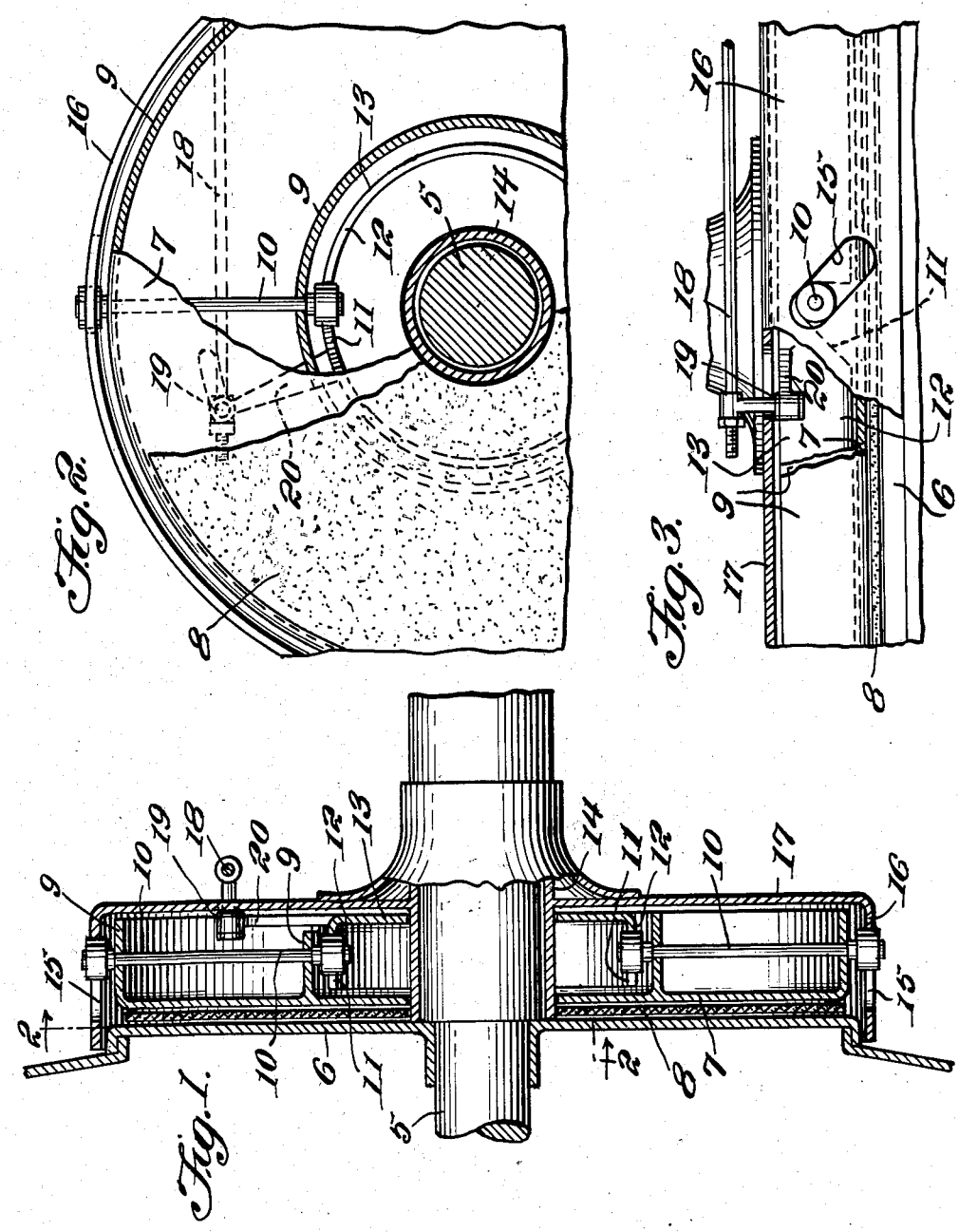

1,986,728

UNITED STATES PATENT OFFICE 1,986,728

BRAKE

Woodrow Hardy, Long Valley, N. J.

Application July 11, 1933, Serial No. 679,942

5 Claims. (Cl. 188—71)

The object of the invention is to provide a brake particularly adaptable for incorporation in motor vehicle constructions to impose a braking action on the wheel that will be intensified by the momentum of the vehicle following the initial movement of the means designed for setting the brake; to provide a brake which may be made part of the conventional vehicle construction without material modification of the latter; and to provide a brake of the kind indicated which is of simple form, constructed of but few parts, and of a character which makes for cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claims.

In the drawing:

Figure 1 is a view partly in section of a portion of a vehicle wheel and associated axle, showing the invention applied in operative position thereon.

Figure 2 is a sectional view on the plane indicated by the line 2—2 of Figure 1.

Figure 3 is a fragmentary plan view, partly in section looking directly on top of the structure as shown in Figure 1.

The invention is designed for application to vehicle equipment to arrest the turning movement of the vehicle wheel mounted upon and rotating in common with the axle 5, the wheel carrying a brake element 6 which, in the illustrated embodiment, is in the form of a disk which may be made separate from the wheel but rigidly secured with respect thereto or which may be made an element of the disk portion of a wheel where the latter is of the disk type. The wheel carried braking element 6 is disposed opposite the chassis carried brake element 7 which is in the form of a disk and which is provided with spaced concentric annular flanges 9 extending laterally in a direction away from the brake element 6. Interposed between the disk 7 and the disk or brake element 6 is a friction disk or lining 8 which may be floatingly mounted between the disks 6 and 7 or secured to either one but not both.

The disk 7 is moved toward and away from the disk 6 by the direct operation of radial members 10, which are in the form of short shafts, journalled in the annular flanges 9 of the disk 7 and terminally provided with rollers of which the inner rollers traverse slots 11 formed in the lateral annular flanges 12 of a disk member 13, this disk member being mounted for angular or turning movement on the axle housing 14 within the drum 17, the laterally extending annular flange 16 of which is provided with slots 15 traversed by the rollers at the outer ends of the shafts 10. The drum 17 is obviously fixed with respect to the axle housing 14.

The slots 11 in the flange 12 and the slots 15 in the flange 16 have their longitudinal axes arranged in angularly related planes and the planes of the axes of the two different sets of slots have the angle formed by them bisected by the plane of the axis of the axle 5. In other words, the slots 11 have an angular position with respect to the axis of the axle 5 and the slots 15 have a similar relation with respect to the axis of the axle but their angular position, while equal to that of the slots 11, is opposite to that of the latter. Thus, if angular or turning movement be imparted to the disk member 13 there will be initial angular or turning movement imparted to the disk 7 by reason of the operative connections provided between the two disks in the form of the radial shafts 10 with their terminal roller portions. But this angular or turning movement imparted to the disk 7 is attended with a movement toward the disk 6, by reason of the outer rolls of the radial shafts traversing the slots 15. If the angular or turning movement be imparted to the disk 13 through the operation of a foot lever or what-not, the relative movement of the cam slots 11 and 15 will result in lateral movement of the disk 7 until the lining or friction disk 8 is firmly compressed between it and the disk 6. But the disk 6 is rotating by virtue of the wheel to which it is attached and the tendency, therefore, is to carry the disk 7 with it and therefore effect further traverse of the roller heads of the shafts 10 along their respective cam slots with a resultant increase in pressure of the disk 7 on the lining or friction disk 8 and a greater pressure of the latter upon the disk 6. Thus, the brake being initially set by foot action, increased braking action is effected by the momentum of the car.

Any acceptable means may be employed for actuating the disk 13 and in the illustrated embodiment this is shown as consisting of an arm 20 connected with the disk and a pull rod 18 connected with the arm by means of a suitable pivotal connection 19. The pull rod 18 may be connected to a foot pedal or equivalent device.

The invention having been described, what is claimed as new and useful is:

1. A brake comprising a wheel having a brake disk carried thereby, a drum, a brake disk located within the drum, an independent angularly movable member within the drum, said member and said drum having cam slots, and means carried by the second said disk and disposed in said cam slots to traverse the same on angular or turning movement being imparted to said independent member, whereby the second said disk is moved toward and away from the wheel carried disk.

2. A brake comprising a wheel having a brake disk, a drum, a second disk housed in the drum and movable toward and away from the wheel carried disk, an angularly movable member housed in the drum, and means carried by said second disk and traversing cam slots formed in said drum and said member respectively.

3. A brake comprising a wheel having a brake disk, a drum, a second disk housed in the drum and movable toward and away from the wheel carried disk, an angularly movable member housed in the drum, and means carried by said second disk and traversing cam slots formed in said drum and said member respectively, the drum carried slots having their longitudinal axes disposed in planes at angles to the planes of the longitudinal axes of the member carried slots.

4. A brake comprising a wheel having a brake disk, a drum, a second disk housed in the drum and movable toward and away from the wheel carried disk, an angularly movable member housed in the drum, and means carried by said second disk and traversing cam slots formed in said drum and said member respectively, the drum carried slots having their longitudinal axes disposed in planes at angles to the planes of the longitudinal axes of the member carried slots with the angles bisected by planes in which the axis of the wheel lies.

5. A brake comprising a wheel having a brake disk carried thereby, an axle-carried drum, a brake disk located within the drum, an independent angularly movable member positioned within the drum and formed with an annular flange, the drum having an annular flange concentric with the flange of said member, means for imparting angular movement to said member, the brake disk being formed with spaced concentric annular flanges interposed between the flanges of said drum and said member, radially arranged shafts rotatably mounted in the flanges of said brake disk, the flanges of said member and said drum being formed with slots whose axes are respectively at reverse angles to the axis of said wheel, and rollers mounted at the opposite extremities of said shafts and respectively traversing the drum and member-carried slots.

WOODROW HARDY.